United States Patent

Faigle et al.

[11] Patent Number: 5,499,843
[45] Date of Patent: Mar. 19, 1996

[54] APPARATUS FOR INFLATING AN INFLATABLE VEHICLE OCCUPANT RESTRAINT

[75] Inventors: Ernst M. Faigle, Imlay City; John H. Semchena, Royal Oak; Richard J. Thompson, Imlay City, all of Mich.

[73] Assignee: TRW Vehicle Safety Systems Inc., Lyndhurst, Ohio

[21] Appl. No.: 267,873

[22] Filed: Jun. 28, 1994

[51] Int. Cl.⁶ .................................................. B60R 21/26
[52] U.S. Cl. ........................... 280/741; 102/531; 422/166
[58] Field of Search ................................ 280/736, 741; 422/164, 165, 166; 102/530, 531

[56] References Cited

U.S. PATENT DOCUMENTS

| 3,052,526 | 9/1962 | Cook et al. | 422/166 |
| 3,649,045 | 3/1972 | Smith et al. | |
| 4,722,551 | 2/1988 | Adams | 280/736 |
| 4,817,828 | 4/1989 | Goetz . | |
| 5,051,143 | 9/1991 | Goetz . | |
| 5,219,178 | 6/1993 | Kobari | 280/736 |
| 5,397,544 | 3/1995 | Kobari et al. | 280/736 |

Primary Examiner—Karin L. Tuson
Attorney, Agent, or Firm—Tarolli, Sundheim & Covell

[57] ABSTRACT

An apparatus for use in inflating an inflatable vehicle occupant restraint (12) comprises a grain (110) of ignitable gas generating material which, when ignited, generates gas for inflating the vehicle occupant restraint (12). The grain (110) of gas generating material has a surface portion defining a cavity (124) in the grain (110). The apparatus further includes a plug (160) of pyrotechnic material which is more readily ignitable than the gas generating material. The plug (160) of pyrotechnic material, when ignited, produces and emits combustion products which ignite the grain (110) of gas generating material. The plug (160) of pyrotechnic material is located in the cavity (124) in the grain (110) of gas generating material.

19 Claims, 8 Drawing Sheets

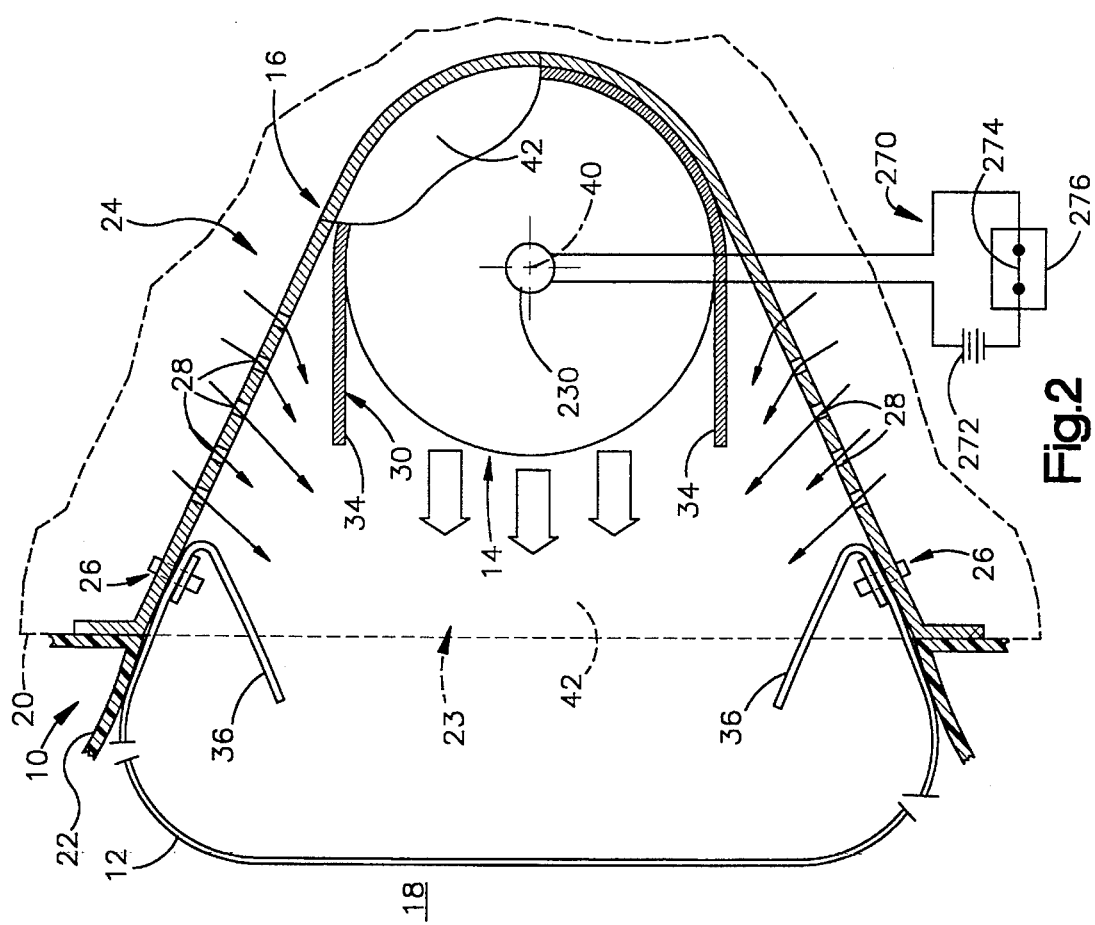
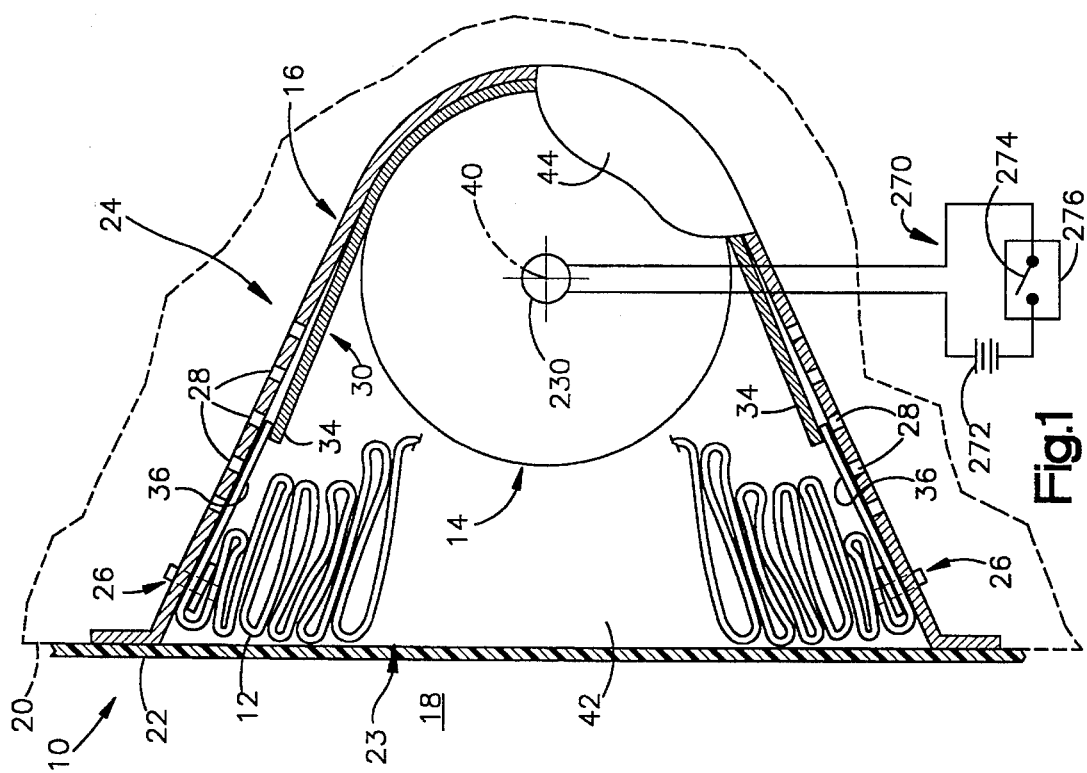

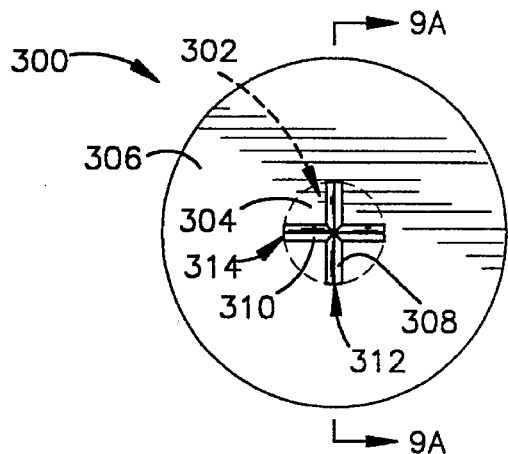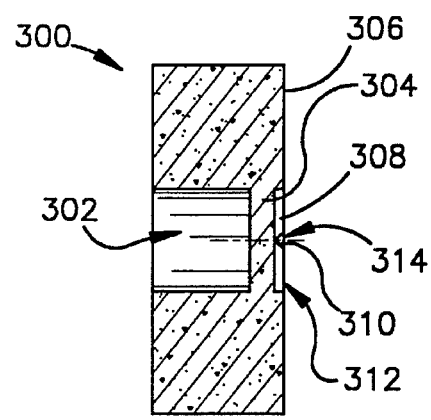
Fig.9  Fig.9A
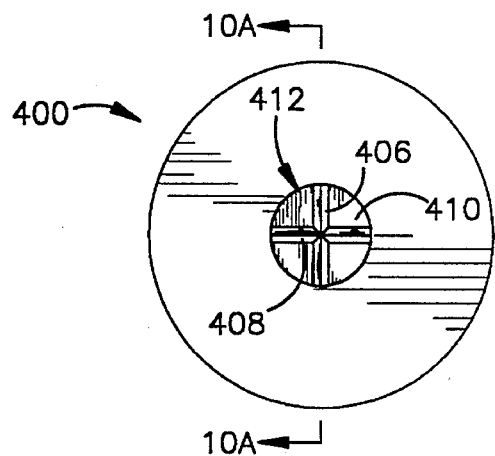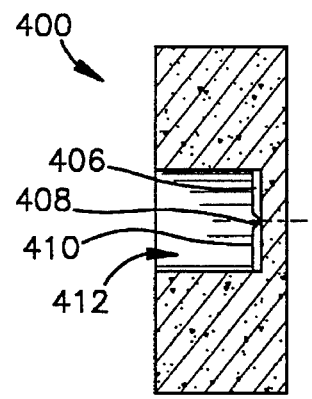
Fig.10  Fig.10A
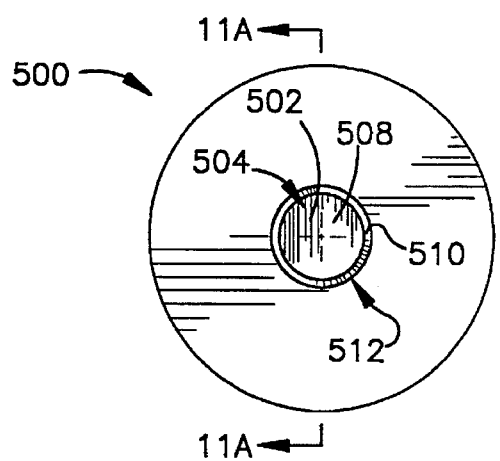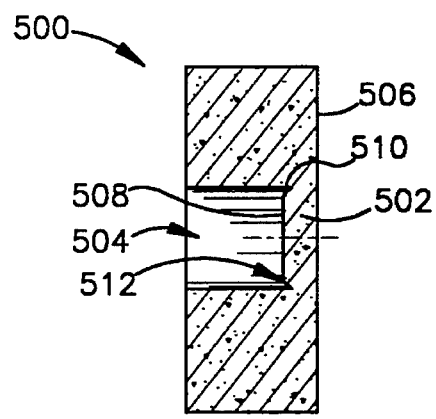
Fig.11  Fig.11A

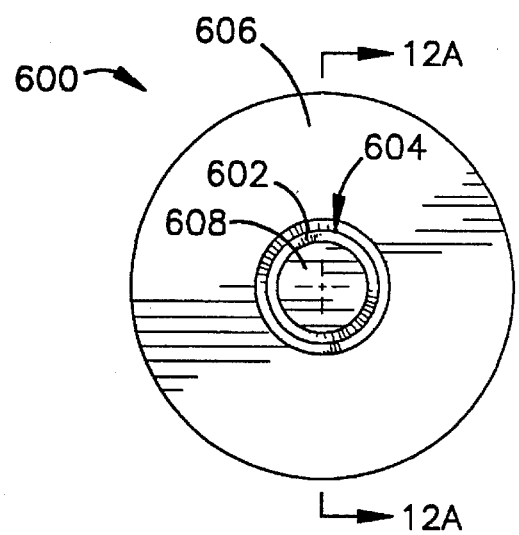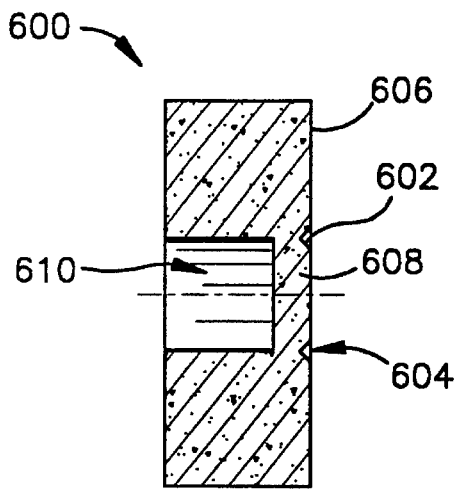
Fig.12    Fig.12A
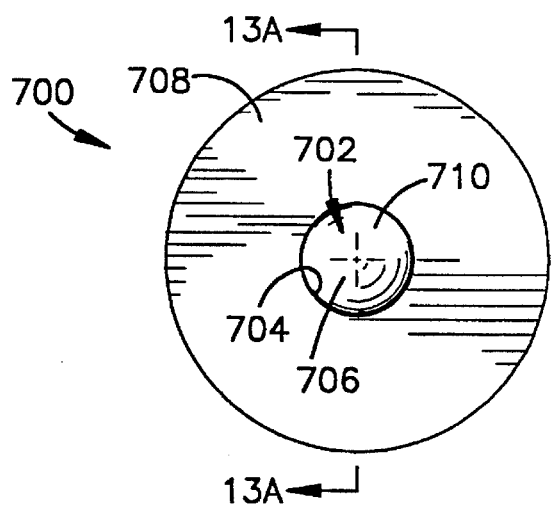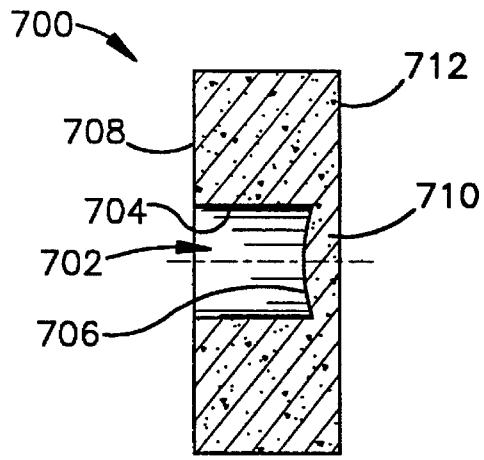
Fig.13    Fig.13A

APPARATUS FOR INFLATING AN INFLATABLE VEHICLE OCCUPANT RESTRAINT

FIELD OF THE INVENTION

The present invention relates to an apparatus for inflating an inflatable vehicle occupant restraint such as an air bag.

BACKGROUND OF THE INVENTION

U.S. Pat. No. 4,817,828 discloses an inflator which comprises a source of gas for inflating an inflatable vehicle occupant restraint such as an air bag. The inflator contains a body of ignitable gas generating material. When the vehicle experiences deceleration of at least a predetermined amount which indicates the occurrence of a vehicle collision, the gas generating material in the inflator is ignited. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

The inflator disclosed in the '828 patent has a cylindrical housing. The housing includes a tubular inner wall and a tubular outer wall. A cylindrical filter is contained in the housing concentrically between the tubular inner wall and the tubular outer wall. The tubular inner wall defines a cylindrical combustion chamber in which the body of gas generating material is contained. An igniter for igniting the body of gas generating material is located at one end of the combustion chamber. A plurality of gas flow openings extend through the tubular inner wall, and thus direct the gas to flow radially outward from the combustion chamber and through the filter toward the tubular outer wall. A plurality of gas flow openings extending through the tubular outer wall similarly direct the gas to flow radially outward from the housing toward the air bag.

The body of gas generating material has substantially the same size and shape as the cylindrical combustion chamber defined by the tubular inner wall of the housing. The body of gas generating material thus has an elongated cylindrical shape with longitudinally opposite ends that are located adjacent to respective opposite ends of the combustion chamber. Moreover, the body of gas generating material is defined by a plurality of separate grains of gas generating material. The grains of gas generating material are arranged concentrically in a row which extends along the length of the combustion chamber. The igniter, which is located at one end of the combustion chamber, is thus located adjacent to the first few grains of gas generating material in the row. As a result of this arrangement, ignition of the body of gas generating material is initiated at the first few grains of gas generating material in the row, and proceeds progressively along the length of the body of gas generating material as successive grains in the row are ignited.

In order to maximize the rate at which ignition progresses along the length of the body of gas generating material, the surface of each grain of gas generating material is coated with a material that is more readily ignitable than the gas generating material of which the grains are formed. The body of gas generating material is thus provided with a coating of an ignition enhancing material which maximizes the rate at which ignition proceeds over the surface of the body of gas generating material. Such a coating can be applied in a spray or a waterfall of the ignition enhancing material, or by dipping the grains of gas generating material in a fluid batch of the ignition enhancing material.

SUMMARY OF THE INVENTION

In accordance with the present invention, an apparatus for use in inflating an inflatable vehicle occupant restraint comprises a body of ignitable gas generating material which, when ignited, generates gas for inflating the vehicle occupant restraint. The body of gas generating material has a surface portion defining a cavity in the body of gas generating material. The apparatus further comprises a means for enhancing the ignition of the body of gas generating material. The ignition enhancing means includes a body of pyrotechnic material which is more readily ignitable than the gas generating material. The body of pyrotechnic material, when ignited, produces and emits combustion products which ignite the body of gas generating material. The body of pyrotechnic material is located in the cavity in the body of gas generating material.

In a preferred embodiment of the present invention, the body of gas generating material is one of several separate grains of gas generating material which together define an elongated cylindrical body of gas generating material. The body of pyrotechnic material is one of several plugs of pyrotechnic material which fill the cavities in the grains of gas generating material.

In the preferred embodiment of the present invention, each of the separate grains of gas generating material has a cylindrical shape, and has first and second opposite side surfaces which are generally perpendicular to the longitudinal central axis of the elongated body of gas generating material. The cavities in the grains of gas generating material are all centered on the longitudinal central axis of the elongated body. The plugs of pyrotechnic material in the cavities are thus supported in axial alignment with each other along the length of the elongated body. Moreover, each of the cavities is open at the first side surface of the respective grain of gas generating material, and communicates with the second side surface through a central passage which extends along the axis from the cavity to the second side surface. The elongated body of gas generating material thus supports the plugs of pyrotechnic material in fluid flow communication with each other through the central passages in the grains of gas generating material.

The preferred embodiment of the present invention further includes an electrically actuatable igniter which is located adjacent to one end of the elongated body of gas generating material. The igniter, when actuated, ignites the first plug of pyrotechnic material in the first grain of gas generating material. The first plug of pyrotechnic material then emits combustion products which ignite the first grain of gas generating material. Additionally, the combustion products emitted from the first plug of pyrotechnic material move through the central passage in the first grain of gas generating material and into contact with the second plug of pyrotechnic material in the second grain of gas generating material. The second plug of pyrotechnic material is thus ignited by the combustion products emitted from the first plug of pyrotechnic material. The second grain of gas generating material is, in turn, ignited by the combustion products emitted from the second plug of pyrotechnic material. This ignition process continues as all of the plugs of pyrotechnic material and all of the grains of gas generating material are ignited successively along the length of the elongated body of gas generating material. As a result, the elongated body of gas generating material is ignited quickly along its entire length.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic view of a vehicle occupant restraint apparatus comprising a preferred embodiment of the present invention;

FIG. 2 is a schematic view showing the apparatus of FIG. 1 in an actuated condition;

FIG. 9 is a view similar to FIG. 5 showing an alternative part of the apparatus of FIG. 1;

FIG. 9A is a view taken on line 9A—9A of FIG. 9; and

FIGS. 10 and 10A, 11 and 11A, 12 and 12A, and 13 and 13A are views of other alternative parts of the apparatus of FIG. 1.

DESCRIPTION OF PREFERRED EMBODIMENTS

Figure 3:
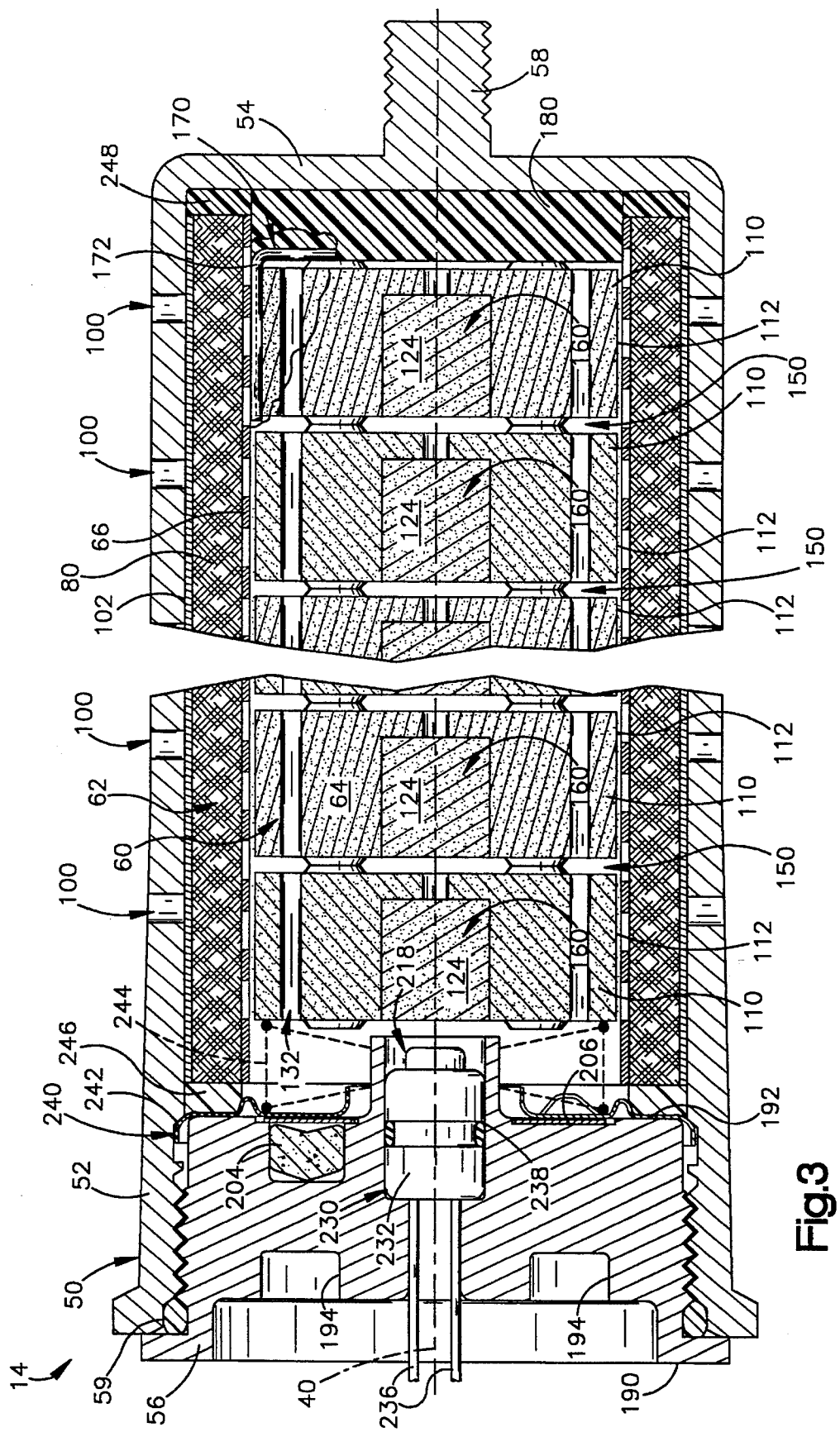
FIG. 3 is a sectional view of parts of the apparatus of FIG. 1.

A vehicle occupant restraint apparatus 10 comprising a preferred embodiment of the present invention is shown schematically in FIGS. 1 and 2. The apparatus 10 includes an inflatable vehicle occupant restraint 12 which is commonly referred to as an air bag. The apparatus 10 further includes an inflator 14 which comprises a source of gas for inflating the air bag 12.

The air bag 12 and the inflator 14 are housed in a reaction canister 16. The reaction canister 16 is mounted in a part of a vehicle that adjoins the vehicle occupant compartment 18, such as the instrument panel 20 of the vehicle. A deployment door 22 extends over a deployment opening 23 in the reaction canister 16. The deployment door 22 continues the trim theme of the instrument panel 20 across the deployment opening 23, and thus conceals the air bag 12 and the reaction canister 16 from the vehicle occupant compartment 18. The air bag 12, the inflator 14, the reaction canister 16 and the deployment door 22 are parts of an air bag module 24 which is assembled separately from the instrument panel 20.

When the vehicle experiences a predetermined amount of deceleration, such as occurs in a collision, the inflator 14 is actuated. The inflator 14 then emits a large volume of gas which flows into the air bag 12 to inflate the air bag 12 from a stored, folded condition (FIG. 1) to an inflated condition (FIG. 2). As the gas begins to inflate the air bag 12, it moves the air bag 12 outwardly against the deployment door 22. A stress riser (not shown) in the deployment door 22 ruptures under the stress induced by the increasing pressure of the gas flowing into the air bag 12 from the inflator 14. As the gas continues to inflate the air bag 12, it moves the air bag 12 outward through the deployment opening 23 past the deployment door 22, as shown in FIG. 2. The air bag 12 then extends into the vehicle occupant compartment 18 to restrain an occupant of the vehicle from forcefully striking the instrument panel 20 or other parts of the vehicle.

The air bag 12 is connected to the reaction canister 16 by suitable clamping assemblies 26. A plurality of ambient air flow openings 28 extend through the reaction canister 16 between the inflator 14 and the air bag 12. A sheet 30 of foil or the like provides a pair of flaps 34 extending from the inflator 14 over several of the ambient air flow openings 28. Additional flaps 36, which preferably comprise edge portions of the air bag 12, extend from the clamping assemblies 26 over the remainder of the ambient air flow openings 28.

As shown schematically in FIGS. 1 and 2, the inflator 14 has a cylindrical shape with a longitudinal central axis 40, and extends axially between two opposite side walls 42 and 44 of the reaction canister 16. As shown in greater detail in FIG. 3, the inflator 14 has a cylindrical housing 50. The housing 50 includes a tubular outer wall 52, a circular end wall 54, and a circular closure cap 56, each of which is centered on the axis 40. The end wall 54 closes one end of the outer wall 52, and supports a threaded mounting stud 58. The closure cap 56 is screwed into the other end of the outer wall 52, and thus closes the other end of the outer wall 52. An elastomeric O-ring seal 59 is received between the closure cap 56 and the outer wall 52.

The housing 50 contains an elongated cylindrical body 60 of ignitable gas generating material. The housing also contains a tubular structure 62. The tubular structure 62 defines a cylindrical combustion chamber 64 in which the elongated cylindrical body 60 of gas generating material is located.

Figure 4:
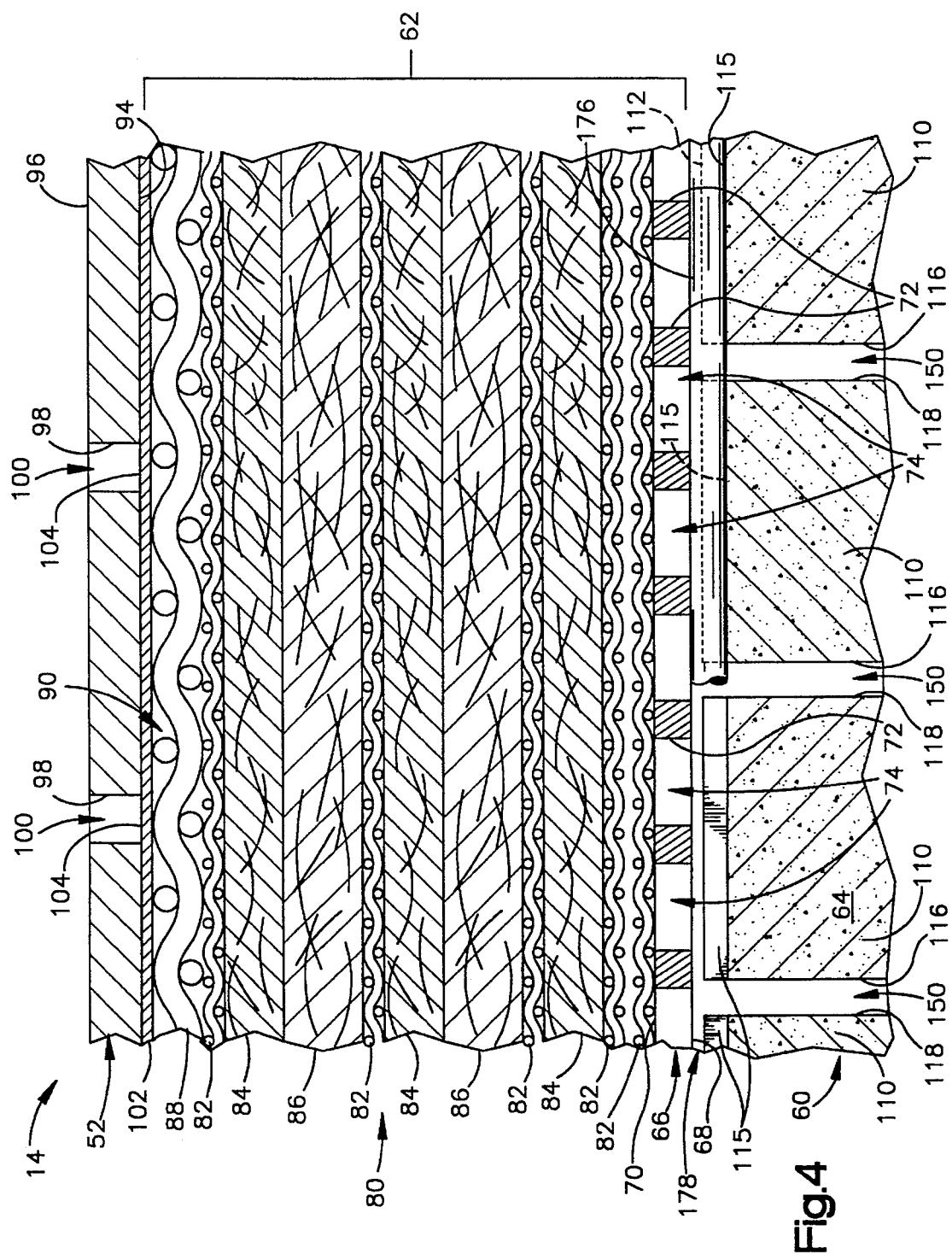
FIG. 4 is an enlarged sectional view of parts shown in FIG. 3.

As shown in enlarged detail in FIG. 4, the tubular structure 62 has a tubular inner wall 66. The inner wall 66 has a cylindrical inner side surface 68 and a cylindrical outer side surface 70. The inner side surface 68 defines the cylindrical combustion chamber 64 in which the elongated body 60 of gas generating material is located. The inner wall 66 further has a plurality of cylindrical inner edge surfaces 72, each of which defines a gas flow opening 74 extending radially through the inner wall 66. Preferably, the inner wall 66 is formed by perforating a sheet of metal to form the openings 74, and by welding the opposite longitudinal edges of the sheet together to form a cylindrical tube.

The tubular structure 62 further includes a generally cylindrical filter 80 which extends circumferentially around the inner wall 66. The filter 80 has a plurality of generally cylindrical filter layers, including layers 82 of wire mesh screen, layers 84 of steel wool, and layers 86 of ceramic/glass wool. The layers 82–86 are formed by laying out flat, flexible sheets of steel wool and ceramic/glass wool in overlying relationship with a flat, flexible sheet of wire mesh screen, and by winding the overlying sheets around the inner wall 66.

The filter 80 also has an optional outer layer 88 of wire mesh screen. The outer layer 88 is formed by wrapping another sheet of wire mesh screen around the layers 82–86 of the filter 80, and by welding the outer layer 88 to the adjacent layer 82 of wire mesh screen. The wire mesh screen of the outer layer 88 has openings that are larger than the openings in any of the underlying layers 82 of wire mesh screen. A plenum 90 is thus defined by the space between the interwoven screen wires of which thee outer layer 88 is formed. Alternatively, the outer layer 88 could be omitted from the filter 80.

As further shown in FIG. 4, the tubular outer wall 52 of the housing 50 has a cylindrical inner side surface 94, a cylindrical outer side surface 96, and a plurality of cylindrical inner edge surfaces 98 which define gas flow openings 100 extending radially through the outer wall 52. A sheet 102 of rupturable pressure controlling material, which is preferably formed of aluminum foil, extends circumferentially around the inner side surface 94 of the outer wall 52 in continuous contact with the inner side surface 94. The sheet 102 thus has a plurality of individual circular portions 104, each of which extends across the inner end of a respective one of the gas flow openings 100 in the outer wall 52.

The sheet 102 of rupturable pressure controlling material is preferably adhered to the, outer wall 52 of the housing 50. The tubular structure 62, which includes the tubular inner wall 66 and the filter 80, is received coaxially within the outer wall 52. When the tubular structure 62 is thus received within the outer wall 52, the outer layer 88 of wire mesh screen in the filter 80 adjoins the sheet 102 of pressure controlling material.

The elongated body 60 of gas generating material is defined by a plurality of separate cylindrical bodies 110 of gas generating material which are known as grains. The gas generating material of which the grains 110 are formed is an ignitable material which rapidly generates a large volume of gas when ignited, and may have any suitable composition known in the art. In the preferred embodiment of the present invention shown in the drawings, the grains 110 of gas generating material are all alike. A typical grain 110 is shown in detail in FIGS. 5 and 6. The typical grain 110 has a cylindrical outer surface 112 centered on an axis 114. The cylindrical outer surface 112 has a plurality of recessed portions 115 which define axially extending notches. The grain 110 further has first and second opposite side surfaces 116 and 118. Each of the opposite side surfaces 116 and 118 has a circular shape centered on the axis 114, and is generally perpendicular to the axis 114.

A cylindrical inner surface 120 of the grain 110 extends from the first side surface 116 to a circular inner surface 122 which is closely spaced from, and generally parallel to, the second side surface 118. The cylindrical inner surface 120 and the circular inner surface 122 are both centered on the axis 114, and together define a cylindrical cavity 124 in the grain 110. The cavity 124 is thus open at the first side surface 116, has a width equal to the diameter of the cylindrical inner surface 120, and has a depth nearly equal to the thickness of the grain 110 between the first side surface 116 and the second side surface 118. In alternative embodiments of the present invention, the shape, the width, and/or the depth of the cavity 124 could be different from that shown in FIGS. 5 and 6. For example, a cavity constructed in accordance with the present invention could have a hexagonal or other non-circular cross-sectional shape, and could have a curved, concave, or tapered inner end surface. Moreover, the width of the cavity could be greater than its depth. Several examples of such alternative grain structures are shown in FIGS. 9–13A, and are described fully below.

The grain 110 further has a plurality of smaller cylindrical inner surfaces 130, each of which defines a respective cylindrical passage 132 extending axially through the grain 110. An optional one of the cylindrical inner surfaces 130 is centered on the axis 114, and extends axially from the circular inner surface 122 to the second side surface 118. The optional cylindrical inner surface 130 at the center of the grain 110 could be omitted, as in the alternative grain structures shown in FIGS. 9–13A.

The other cylindrical inner surfaces 130 extend entirely between the opposite side surfaces 116 and 118, and are arranged in first and second circular arrays. The first circular array of the cylindrical inner surfaces 130 extends circumferentially around the axis 114 on a first circular line 134.

The first circular line 134 is centered on the axis 114. The second circular array of the cylindrical inner surfaces 130 extends circumferentially around the axis 114 on a second circular line 136. The second circular line 136 also is centered on the axis 114, and is spaced radially outward from the first circular line 134. Moreover, each of the cylindrical inner surfaces 130 in the second circular array is at least partially offset circumferentially from each of the cylindrical inner surfaces 130 in the first circular array.

Figure 5:
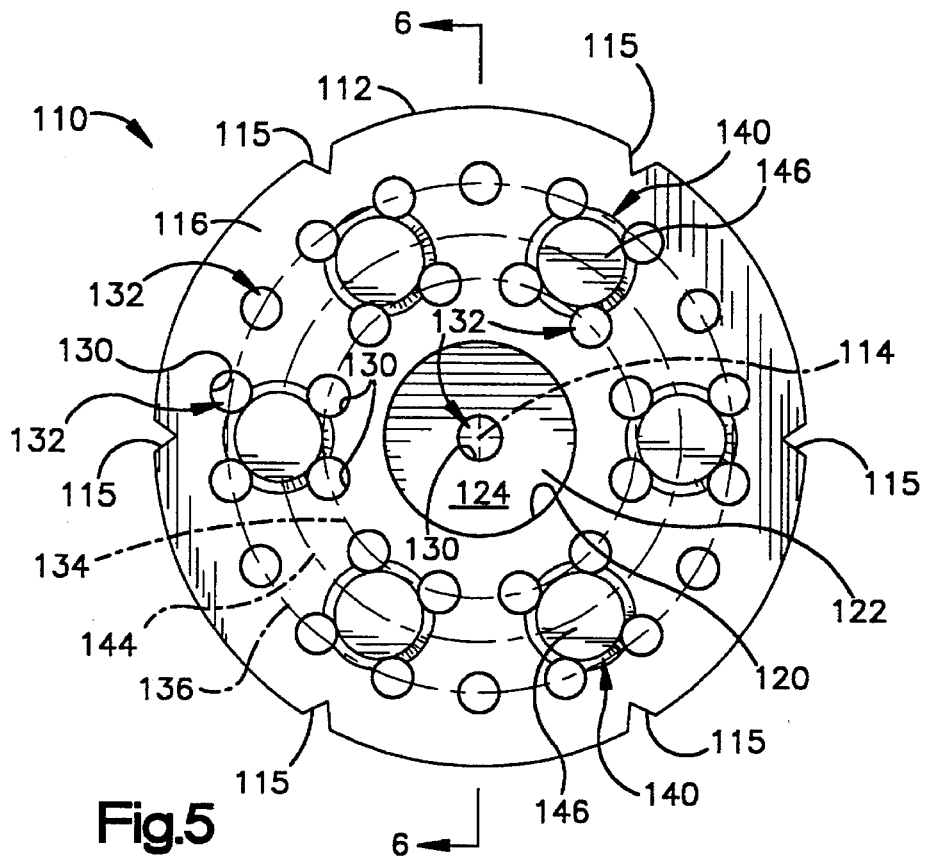
FIG. 5 is an enlarged view of a part shown in FIG. 3.
Figure 6:
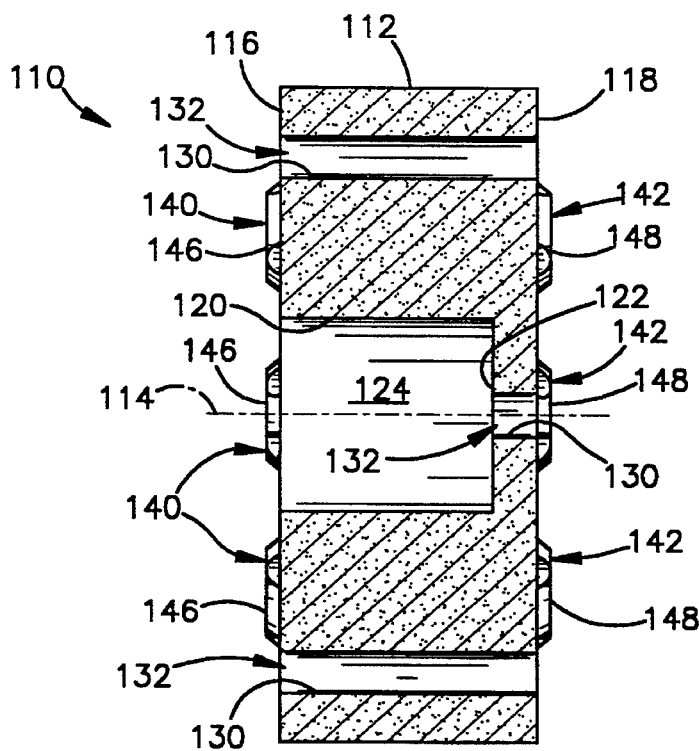
FIG. 6 is a view taken on line 6—6 of FIG. 5.

As further shown in FIGS. 5 and 6, the typical grain 110 of gas generating material has a plurality of stand-off pads, including first stand-off pads 140 and second stand-off pads 142. The first stand-off pads 140 are all alike, and are arranged on the first side surface 116 in a circular array which extends circumferentially around the axis 114 on a third circular line 144. Each of the first stand-off pads 140 projects a short distance from the first side surface 116, and has a circular stand-off surface 146 which is parallel to the first side surface 116. Each of the second stand-off pads 142 similarly projects a short distance from the second side surface 118, and has a circular stand-off surface 148 which is parallel to the second side surface 118. Additionally, each of the second stand-off pads 142 has the same size and shape as a respective one of the first stand-off pads 140, and is concentric with the respective one of the first stand-off pads 140, as shown in FIG. 6.

Figure 8:
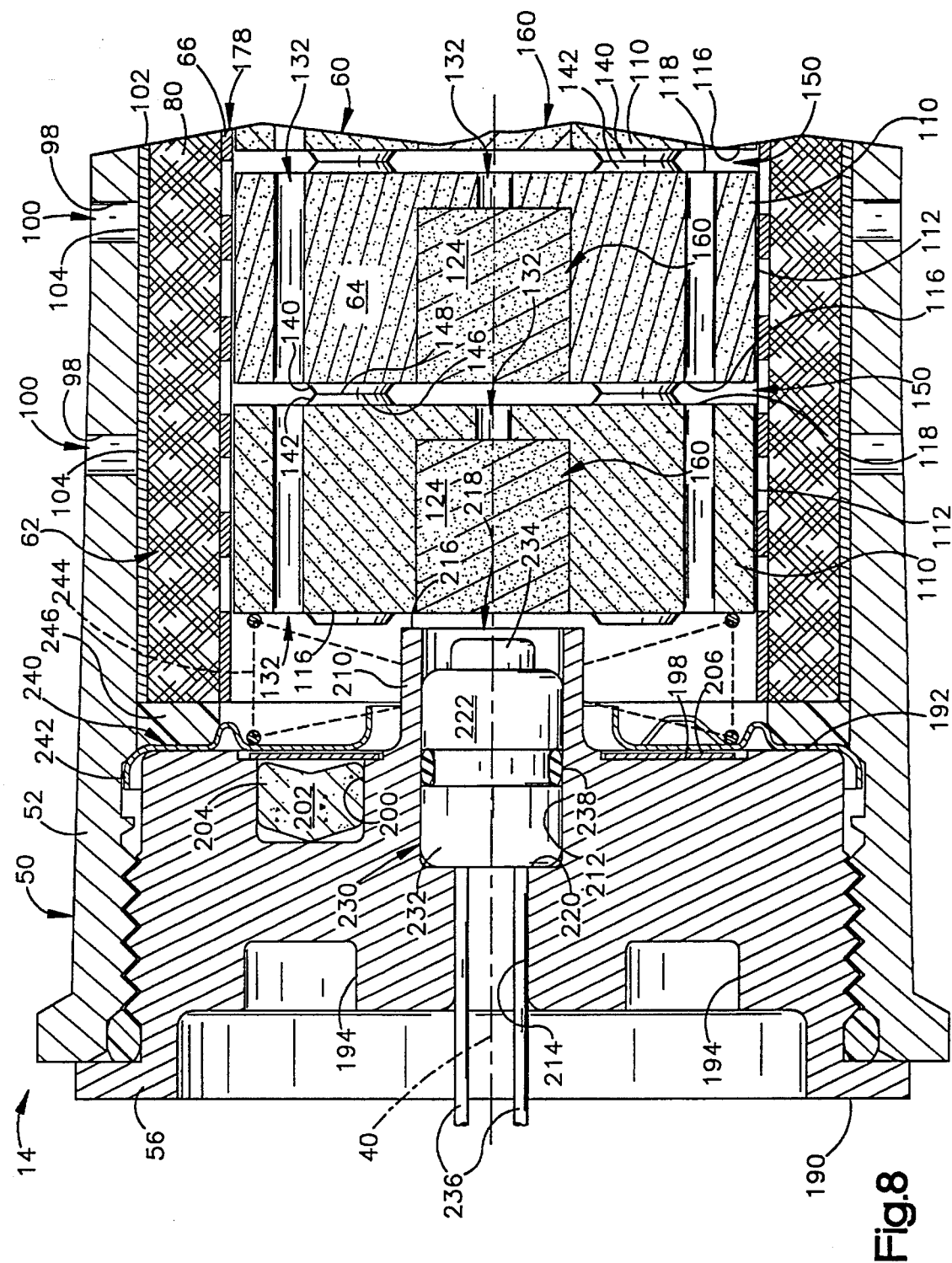
FIG. 8 is an enlarged sectional view of parts shown in FIG. 3.

As shown in FIGS. 3 and 8, the grains 110 of gas generating material are received coaxially within the combustion chamber 64, with the cylindrical outer surfaces 112 of the grains 110 adjacent to the cylindrical inner side surface 68 of the tubular inner wall 66. Additionally, the first stand-off pads 140 and the second stand-off pads 142, respectively, of adjacent grains 110 are concentric with each other, and abut each other at the stand-off surfaces 146 and 148. For each pair of adjacent grains 110, the side surfaces 116 and 118 that face axially toward each other are spaced from each other by the abutting stand-off pads 140 and 142. A plurality of spaces 150 are thereby defined by and between the grains 110 of gas generating material. Each of the spaces 150 extends axially between the respective facing side surfaces 116 and 118, and is radially coextensive with the respective facing side surfaces 116 and 118. As a result, each space 150 provides fluid communication between all of the cylindrical passages 132 in the pair of adjacent grains 110 that define the space 150.

As further shown in FIGS. 3 and 8, a plurality of bodies of pyrotechnic material are contained in the combustion chamber 64 with the grains 110 of gas generating material. Each of the bodies of pyrotechnic material takes the form of a plug 160 which is received in the cavity 124 in a respective one of the grains 110 of gas generating material. The pyrotechnic material of which the plugs 160 are formed does not generate a significant amount of gas for inflating the air bag 12, but is more readily ignitable than the gas generating material of which the grains 110 are formed. The pyrotechnic material may have the composition of any of the known pyrotechnic materials which, in the prior art, are used to provide a coating of ignition enhancing material on a grain of gas generating material. However, unlike such a coating, each of the plugs 160 is formed by depositing a fluid mass of the pyrotechnic material in the cavity 124 in the respective grain 110. The pyrotechnic material at each grain 110 is thus concentrated in the form of the plug 160 at the center of the grain 110. When the fluid mass of pyrotechnic material sets or hardens in the form of the solid plug 160, it adheres to the surfaces 120 and 122 of the grain 110 in the cavity 124. The plug 160 thus remains in place within the cavity 124 during assembly of the inflator 14, and does not rattle within the grain 110 when the inflator 14 is installed in the vehicle. Preferably, each of the grains 110 contains such a plug 160 of pyrotechnic material, and each plug 160 preferably fills the respective cavity 124. Moreover, each of the grains 110 of gas generating material is most preferably free of a coating of such a pyrotechnic material, as shown in the drawings.

Figure 7:
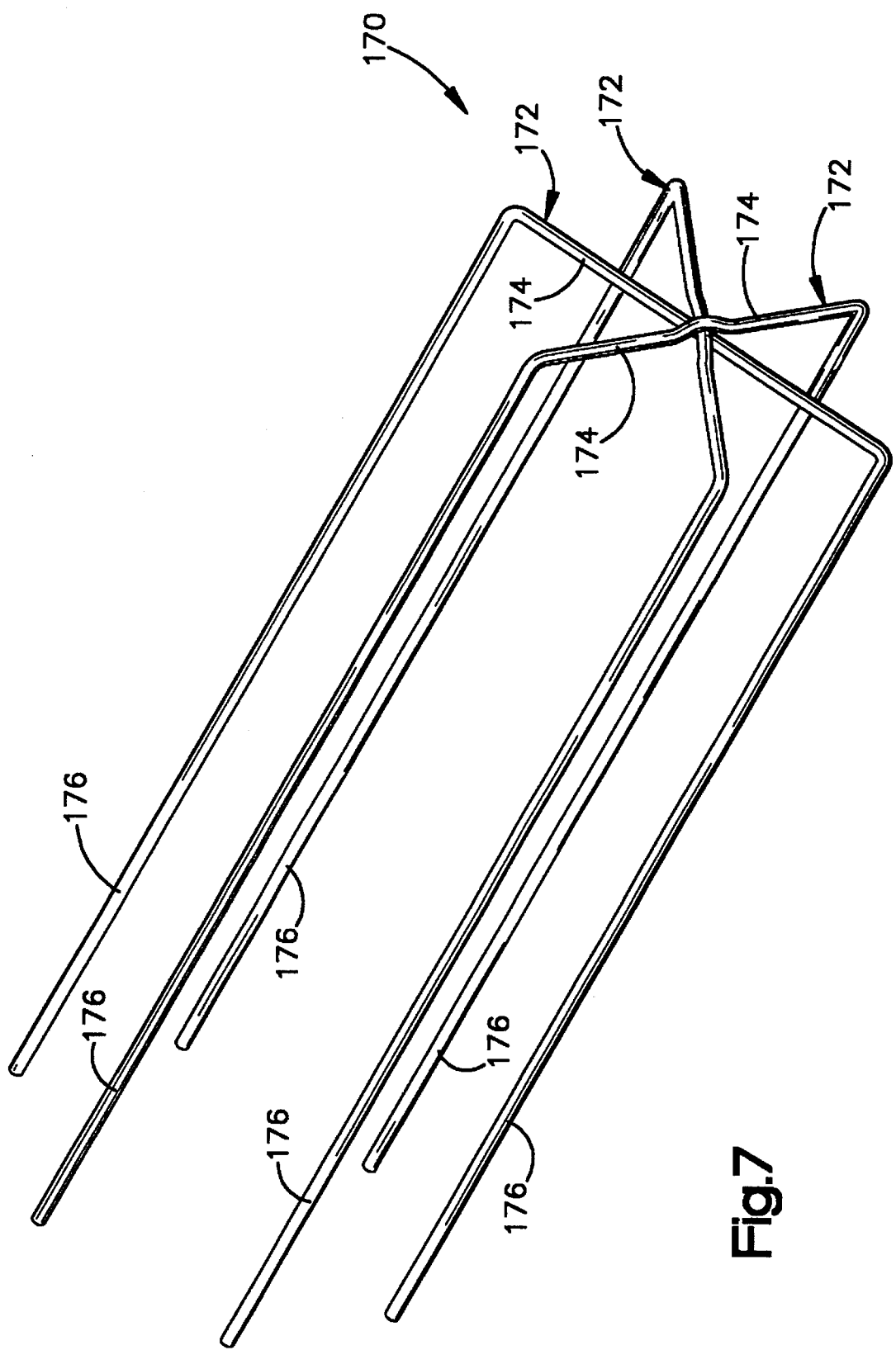
FIG. 7 is an enlarged view of other parts shown in FIG. 3.

An optional first retainer assembly 170 is contained in the combustion chamber 64 with the elongated body 60 of gas generating material, and holds the grains 110 in the aligned positions described above. As shown in FIG. 7, the first retainer assembly 170 includes a plurality of U-shaped retainer members 172, each of which has a base portion 174 and a pair of elongated arms 176. The retainer members 172 are preferably formed of an elastomeric material such as silicone rubber.

When the grains 110 are received in the combustion chamber 64, the recessed outer surface portions 115 of the grains 110 are aligned with each other along the entire length of the elongated body 60 of gas generating material, as shown partially in FIG. 4. The arms 176 of the retainer members 172 are received in the notches defined by the recessed surface portions 115, and hold the grains 110 from moving circumferentially relative to each other. The arms 176 also space the cylindrical outer surfaces 112 of the grains 110 a small distance from the cylindrical inner side surface 68 of the surrounding tubular wall 66. An additional fluid flow space 178 is thus defined about the cylindrical periphery of the elongated body 60 of gas generating material. Although the first retainer assembly 170 is included in the inflator 14 as shown in the drawings, it is optional and could alternatively be omitted. If the first retainer assembly 170 is omitted, the recessed portions 115 of the cylindrical outer surfaces 112 could be omitted from the structures of the grains 110 of gas generating material.

An elastomeric pad 180 (FIG. 3) is placed in the housing 50 between the end wall 54 and the base portions 174 of the retainer members 172. The pad 180 holds the first retainer assembly 170 and the grains 110 securely in place, and also protects the grains 110 from being broken upon assembly of the inflator 14. A hermetic seal for protecting the gas generating material also could be provided in the housing 50, and could comprise any suitable structure known in the art.

As shown in enlarged detail in FIG. 8, the closure cap 56 has an outer side surface 190 facing outward along the axis 40, and has an inner side surface 192 facing inward along the axis 40. The outer side surface 190 includes a plurality of recessed surface portions 194. The recessed surface portions 194 are designed to mate with projecting surface portions of a tool (not shown) that engages the closure cap 56 to screw the closure cap 56 into the tubular outer wall 52 upon assembly of the inflator 14.

The inner side surface 192 of the closure cap 56 includes a first recessed surface portion 198 and a second recessed surface portion 200. The first recessed surface portion 198 has an annular shape centered on the axis 40. The second recessed surface portion 200 defines a compartment 202 with an open end at the first recessed surface portion 198. A piece 204 of auto-ignition material, which may have any suitable composition known in the art, is contained in the compartment 202. An annular strip of metal foil tape 206 extends circumferentially around the first recessed surface portion 198 and over the open end of the compartment 202. The tape 206 is fixed to the first recessed surface portion 198 by any suitable means, such as by an adhesive, and thus establishes a hermetic seal which closes the open end of the compartment 202.

The closure cap 56 further has a projecting portion 210, a first cylindrical inner surface 212, and a second cylindrical inner surface 214, each of which is centered on the axis 40. The projecting portion 210 projects axially from the inner side surface 192, and includes part of the first cylindrical inner surface 212. An annular end surface 216 of the projecting portion 210 defines a circular opening 218 which also is centered on the axis 40.

The first cylindrical inner surface 212 of the closure cap 56 extends axially from the opening 218 to an annular inner surface 220 of the closure cap 56. A cylindrical compartment 222 is thus defined between the annular inner surface 220 and the opening 218. The second cylindrical inner surface 214 of the closure cap 56 has a diameter which is less than the diameter of the first cylindrical inner surface 212, and extends axially from the annular inner surface 220 to the outer side surface 190.

The inflator 14 further includes a squib 230 which is supported by the closure cap 56. The squib 230 is of known construction and, as shown in FIG. 8, has a cylindrical metal casing 232 which is received in the compartment 222. The casing 232 has a rupturable forward end portion 234 adjacent to the opening 218 in the closure cap 56. A pair of lead wires 236 extend from the casing 232 to the exterior of the housing 50 through a passage defined by the second cylindrical inner surface 214 of the closure cap 56.

The casing 232 contains a pyrotechnic material which is ignited upon the passage of electric current through the squib 230 between the lead wires 236. When the pyrotechnic material in the casing 232 is ignited, it produces combustion products which rupture the forward end portion 234 of the casing 232 and emerge from the casing 232. An elastomeric O-ring 238 provides a hermetic seal between the casing 232 and the first cylindrical inner surface 212 of the closure cap 56. The closure cap 56 and the O-ring 238 thus support the squib 230 in a position from which it will spew the combustion products outward from the casing 232 and through the opening 218 in a direction from the left to the right along the axis 40, as viewed in FIG. 8.

A second retainer assembly 240 also is contained in the housing 50. As shown in FIGS. 3 and 8, the second retainer assembly 240 includes a metal retainer ring 242 and a spring 244 (shown schematically). The retainer ring 242 overlies the inner side surface 192 of the closure cap 56, and extends radially outward between the inner side surface 192 and an annular elastomeric sealing ring 246 which adjoins the tubular structure 62. The closure cap 56 presses the retainer ring 242 firmly against the sealing ring 246 and the tubular structure 62. The closure cap 56 also presses the tubular structure 62 firmly against another annular elastomeric sealing ring 248 (FIG. 3) which adjoins the end wall 54 and encircles the elastomeric pad 180 at the other end of the housing 50.

The spring 244 is compressed axially between the retainer ring 242 and the first grain 110 of gas generating material adjacent to the closure cap 56. The spring 244 thus presses the elongated body 60 of gas generating material firmly against the pad 180 (FIG. 3) that adjoins the end wall 54 at the other end of the housing 50. The spring 244 presses the grains 110 of gas generating material together firmly enough to prevent them from rattling within the housing 50, but also provides a compressible cushion which protects the grains 110 from being broken when the closure cap 56 is moved forcefully against the retainer ring 242 upon movement of the closure cap 56 into the installed position shown in FIGS. 3 and 8. The second retainer assembly 240 is preferably constructed in accordance with the invention set forth in co-pending U.S. patent application Ser. No. 129,455, filed Sep. 29, 1993, now U.S. Pat. No. 5,380,039, entitled "Air Bag Inflator," and assigned to TRW Vehicle Safety Systems Inc.

When the inflator 14 is installed in the reaction canister 16 as shown in FIGS. 1 and 2, the squib 230 is included in an electrical circuit 270. The electrical circuit 270 further includes a power source 272, which is preferably the vehicle battery and/or a capacitor, and a normally open switch 274. The switch 274 is preferably part of a deceleration sensor 276 which senses vehicle deceleration. The deceleration sensor 276 closes the switch 274 upon sensing vehicle deceleration of at least a predetermined amount. The predetermined amount of deceleration is an amount which indicates the occurrence of a vehicle collision for which inflation of the air bag 12 is desired to protect an occupant of the vehicle.

When the switch 274 in the circuit 270 is closed, electric current passes through the squib 230 between the lead wires 236. The pyrotechnic material in the squib 230 is then ignited and, as described above, the squib 230 spews combustion products through the opening 218 in the closure cap 56. The combustion products emerging from the opening 218 move against and ignite the first plug 160 of pyrotechnic material which is contained in the cavity 124 in the first grain 110 of gas generating material adjacent to the closure cap 56.

When the first plug 160 of pyrotechnic material is ignited, it rapidly produces and emits additional combustion products. Some of those combustion products move against the inner surfaces 120 and 122 in the cavity 124 in the first grain 110 of gas generating material, and also move over the first side surface 116 of the first grain 110 facing the closure cap 56. Those combustion products ignite the first grain 110 at the surfaces 120, 122 and 116. Additionally, some of the combustion products emitted from the first plug 160 move through the passage 132 at the center of the first grain 110 and into the space 150 between the first and second grains 110. Those combustion products move against the second plug 160 of pyrotechnic material in the second grain 110 of gas generating material. As a result, the second plug 160 in the second grain 110 also is ignited and, in turn, emits additional combustion products.

Some of the combustion products emitted from the second plug 160 of pyrotechnic material move into the space 150 between the first two grains 110 of gas generating material. Those combustion products, along with the combustion products emerging from the passage 132 at the center of the first grain 110, move against the side surfaces 116 and 118 of the two grains 110 which face each other across the space 150. The combustion products emitted from the second plug 160 further move through the central passage 132 in the second grain 110, into the next adjacent space 150, and into contact with the next adjacent plug 160 and the next adjacent grain 110. This process continues along the length of the elongated body 60 of gas generating material as all of the plugs 160 of pyrotechnic material and all of the grains 110 of gas generating material are ignited successively in the foregoing manner. The fluid communication provided by the other passages 132 in the grains 110, and by the peripheral space 178, enables further movement of the combustion products over the ignitable surfaces of the grains 110. The elongated body 60 of gas generating material is thus ignited quickly along its entire length so that gas for inflating the air bag 12 is generated quickly along the entire length of the elongated body 60.

The gas generated upon combustion of the gas generating material flows radially outward through the gas flow openings 74 (FIG. 4) in the tubular inner wall 66. The gas is then cooled and filtered as it flows radially outward from the tubular inner wall 66 through the layers 82–88 of the filter 80. The gas is at first confined within the filter 80 by the sheet 102 of rupturable pressure controlling material. When the pressure of the gas acting radially outward against the sheet 102 reaches a predetermined elevated level, it ruptures the circular portions 104 of the sheet 102 which extend across the inner ends of the gas flow openings 100 in the tubular outer wall 52. The gas then flows radially outward through the gas flow openings 100 at the predetermined elevated pressure level.

As indicated schematically by the large arrows in FIG. 2, the gas flowing radially outward from the inflator 14 is directed toward the air bag 12 by the reaction canister 16. This flow of gas causes a reduction in the gas pressure inside the reaction canister 16 adjacent to the flaps 34 and 36. The reduction in the gas pressure inside the reaction canister 16 causes ambient air outside the reaction canister 16 to flow inward through the ambient air flow openings 28 and past the flaps 34 and 36, as indicated schematically by the small arrows in FIG. 2. The ambient air mixes with the gas in the reaction canister 16 and cools the gas. The ambient air also augments the flow of gas into the air bag 12, and thus reduces the amount of gas which must be generated by the gas generating material in the inflator 14. The air bag 12 is thus inflated into vehicle occupant compartment 18 to restrain an occupant of the vehicle.

Examples of other grains of gas generating material constructed in accordance with the present invention are shown in FIGS. 9–13A. Unlike the grain 110 shown in FIGS. 5 and 6, each of the grains shown in FIGS. 9–13A has an alternative structure which omits stand-off pads and cylindrical inner surfaces that define passages extending through the grain. The stand-off pads 140 and 142 on the grain 110, and the cylindrical inner surfaces 130 of the grain 110 that extend in circular arrays, are optional features that could be included in any one of the alternative grain structures shown in FIGS. 9–13A. However, the central cylindrical inner surface 130 defining the passage 132 at the center of the grain 110 is most preferably omitted from each of the alternative grain structures shown in FIGS. 9–13A. Instead of having a passage extending through the center of the grain, each of the alternative grain structures has an alternative means for providing fluid communication between the cavity and the second side surface of the grain.

For example, as shown in FIGS. 9 and 9A, a grain 300 of gas generating material has a cavity 302 like the cavity 124 (FIG. 5), and further has a circular portion 304 located axially between the cavity 302 and the second side surface 306 of the grain 300. The circular portion 304 of the grain 300 blocks fluid communication between the cavity 302 and the second side surface 306 before the grain 300 is ignited. A pair of orthogonal recessed surfaces 308 and 310 define a respective pair of orthogonal grooves 312 and 314 extending diametrically across the circular portion 304 at the second side surface 306. The recessed surfaces 308 and 310 thus define thinned sections of the grain 300 that extend diametrically across the circular portion 304 co-extensively with the grooves 312 and 314.

When the grain 300 is ignited, the thinned sections at the circular portion 304 rupture relatively early during the combustion of the grain 300. As a result, fluid communication is provided between the cavity 302 and the second side surface 306 relatively early during the combustion of the grain 300. The products of combustion that are emitted from a plug of pyrotechnic material contained in the cavity 302 are then directed axially outward from the cavity 302 past the second side surface 306 in the same manner as described above with reference to the grains 110.

The grain 400 of gas generating material shown in FIGS. 10 and 10A has thinned sections that are substantially similar to the thinned sections of the grain 300 shown in FIGS. 9 and 9A. However, in the grain 400, the thinned sections are defined by orthogonal recessed surfaces 406 and 408 that extend diametrically across a circular inner surface 410 at the inner end of the cavity 412 in the grain 400, rather than extending across the second side surface 414 of the grain 400.

The grain 500 of gas generating material shown in FIGS. 11 and 11A has a circular portion 502 located axially between the cavity 504 in the grain 500 and the second side surface 506 of the grain 500. A circular inner surface 508 of the grain 500 defines the inner end of the cavity 504, and a recessed surface 510 defines an annular groove 512 at the perimeter of the circular inner surface 508. The recessed surface 510 thus defines a thinned section of the grain 500 in an annular shape at the perimeter of the circular portion 502 of the grain 500. As shown in FIGS. 12 and 12A, a similar grain 600 of gas generating material has a recessed surface 602 defining an annular groove 604 at the second side surface 606 of the grain. The recessed surface 602 thus defines a thinned annular section of the grain 600 at the perimeter of a circular portion 608 which is located axially between the cavity 610 in the grain 600 and the second side surface 606 of the grain 600.

As shown in FIGS. 13 and 13A, a grain 700 of gas generating material has a cavity 702 which is defined by a cylindrical inner surface 704 and a circular inner surface 706. The circular inner surface 706 is convex relative to the first side surface 708 of the grain 700. The circular inner surface 706 and the cylindrical inner surface 704 thus converge at the perimeter of a circular portion 710 of the grain 700 which is located axially between the cavity 702 and the second side surface 712 of the grain 700. The converging inner surfaces 704 and 706 define a thinned annular section of the grain 700 at the perimeter of the circular portion 710 of the grain 700.

Although each of the grains of gas generating material shown in FIGS. 9–13A has a respective structural feature comprising a means for defining one or more thinned sections of the grain, a grain of gas generating material constructed in accordance with the present invention can have any combination of such structural features.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use in inflating an inflatable vehicle occupant restraint, said apparatus comprising:

a body of ignitable gas generating material which, when ignited, generates a volume of gas for inflating the vehicle occupant restraint, said body of said gas generating material having a surface portion defining a cavity in said body of said gas generating material; and means for enhancing ignition of said body of said gas generating material, said ignition enhancing means including a body of pyrotechnic material which is more readily ignitable than said gas generating material and which, when ignited, produces and emits combustion products which ignite said body of said gas generating material, said body of said pyrotechnic material being located in said cavity;

said cavity having a width and a depth, said body of said pyrotechnic material being a plug of said pyrotechnic material which extends entirely across said width of said cavity;

said surface portion of said body of said gas generating material includes a first inner surface extending along said depth of said cavity and a second inner surface extending across said width of said cavity.

2. Apparatus as defined in claim 1 wherein said plug of said pyrotechnic material fills said cavity.

3. Apparatus as defined in claim 1 wherein said body of said gas generating material has first and second opposite side surfaces, said first and second opposite side surfaces being parallel to said second inner surface, said cavity being open at said first side surface, said body of said gas generating material further having means for providing fluid communication between said second inner surface and said second side surface.

4. Apparatus as defined in claim 3 wherein said means for providing fluid communication includes a surface defining a thinned section of said body of said gas generating material located between said cavity and said second side surface, said thinned section providing a rupturable portion of said body of said gas generating material.

5. Apparatus as defined in claim 3 wherein said means for providing fluid communication includes a surface defining a passage which extends from said second inner surface to said second side surface.

6. Apparatus as defined in claim 5 wherein said passage is open between said second inner surface and said second side surface.

7. Apparatus as defined in claim 5 wherein said body of said gas generating material has a central axis, said cavity and said passage having cylindrical shapes centered on said central axis.

8. Apparatus as defined in claim 1 wherein said body of said pyrotechnic material is adhered to said body of said gas generating material.

9. Apparatus as defined in claim 1 wherein said body of said gas generating material is free of a coating formed of said pyrotechnic material.

10. Apparatus for use in inflating an inflatable vehicle occupant restraint, said apparatus comprising:

an elongated cylindrical body of gas generating material which, when ignited, generates a volume of gas for inflating the vehicle occupant restraint, said elongated cylindrical body of said gas generating material having a longitudinal central axis and comprising a plurality of separate cylindrical bodies of said gas generating material, each of said separate cylindrical bodies of said gas generating material being centered on said axis and having first and second opposite side surfaces transverse to said axis, each of said separate cylindrical bodies of said gas generating material further having an inner surface portion defining a cavity which is open at its respective first side surface, said inner surface portion having a first inner surface defining a depth of said cavity and a second inner surface defining a width of said cavity;

a plurality of bodies of pyrotechnic material which is more readily ignitable than and enhances the ignition of said gas generating material, each of said bodies of said pyrotechnic material being located in a respective one of said cavities in said separate cylindrical bodies of said gas generating material; and igniter means for igniting said bodies of said pyrotechnic material contained circumferentially within said elongated cylindrical body of said gas generating material, said igniter means including an actuatable igniter device located adjacent to one end of said elongated cylindrical body of said gas generating material.

11. Apparatus as defined in claim 10 wherein each of said separate cylindrical bodies of said gas generating material has a means for defining a thinned section of said bodies of said gas generating material axially between its respective second inner surface and its respective second side surface, said thinned section providing a rupturable portion for each of said separate cylindrical bodies of said gas generating material.

12. Apparatus as defined in claim 10 wherein each of said separate cylindrical bodies of said gas generating material has a third inner surface defining a passage extending from its respective second inner surface to its respective second side surface.

13. Apparatus as defined in claim 12 wherein each of said passages is open between its respective second inner surface and its respective side surface.

14. Apparatus as defined in claim 12 wherein said cavities are aligned with each other in a direction parallel to said axis, said passages also being aligned with each other in said direction parallel to said axis.

15. Apparatus as defined in claim 12 wherein each of said cavities has a cylindrical shape centered on said axis.

16. Apparatus as defined in claim 14 wherein each of said passages has a cylindrical shape centered on said axis.

17. Apparatus as defined in claim 10 wherein said elongated cylindrical body of said gas generating material is defined entirely by said separate cylindrical bodies of said gas generating material, each of said cavities in said separate cylindrical bodies of said gas generating material containing a respective one of said bodies of said pyrotechnic material.

18. Apparatus as defined in claim 10 wherein each of said bodies of said pyrotechnic material fills its respective one of said cavities in said separate cylindrical bodies of said gas generating material.

19. Apparatus as defined in claim 10 wherein said elongated cylindrical body of said gas generating material is free of a coating formed of said pyrotechnic material.

* * * * *